United States Patent [19]

Mizuguchi et al.

[11] Patent Number: 5,144,333
[45] Date of Patent: Sep. 1, 1992

[54] PROCESS FOR THE STORAGE OF INFORMATION IN AN ORGANIC RECORDING LAYER

[75] Inventors: Jin Mizuguchi; Alain C. Rochat, both of Fribourg, Switzerland

[73] Assignee: Ciba-Geigy Corporation, Ardsley, N.Y.

[21] Appl. No.: 532,531

[22] Filed: Jun. 4, 1990

[30] Foreign Application Priority Data

Jun. 9, 1989 [CH] Switzerland .................... 2173/89

[51] Int. Cl.$^5$ ............................................. G11B 9/00
[52] U.S. Cl. ........................ 346/1.1; 346/140 R; 428/195; 427/74; 427/75; 427/108; 427/109; 427/110; 427/162; 427/164; 427/165; 427/168; 427/256; 427/273; 427/287; 427/335; 427/336; 427/421
[58] Field of Search ............... 427/162, 164, 165, 168, 427/335, 336, 108, 109, 110, 256, 273, 287, 74, 75, 421; 346/1.1, 75, 78, 140 R; 428/125

[56] References Cited

U.S. PATENT DOCUMENTS

| | | | |
|---|---|---|---|
| 3,932,695 | 1/1976 | Davis et al. | 428/531 |
| 4,246,033 | 1/1981 | von Wartburg | 106/23 |
| 4,252,601 | 2/1981 | Ceintrey | 346/1.1 |
| 4,252,845 | 2/1981 | Griffiths et al. | 427/273 |
| 4,307,047 | 3/1981 | Edinger et al. | 264/25 |
| 4,318,937 | 3/1982 | Ceintrey | 427/56.1 |
| 4,391,764 | 7/1983 | Edinger et al. | 264/25 |
| 4,415,685 | 11/1983 | Iqbal et al. | 524/92 |
| 4,632,813 | 12/1986 | Anastasi et al. | 423/310 |
| 4,632,893 | 12/1986 | Rochat et al. | 430/58 |
| 4,760,004 | 7/1988 | Rochat et al. | 430/58 |

FOREIGN PATENT DOCUMENTS

| | | | |
|---|---|---|---|
| 0049762 | 3/1983 | Japan | 346/1.1 |
| 0005435 | 2/1984 | Japan | 346/1.1 |

OTHER PUBLICATIONS

Xerox Disclosure Journal, vol. 1, No. 3, Mar. 1976, Gerace et al. *Liquid Jet Imaging System.*
8188 Journal of Imaging Tech. 12 (1986) Jun. No. 3 pp. 140–143.
Abstract vol. 8 NO. 57 (M—283) (1494) Mar. 15, 1984.
Abstract vol. 9 No. 319 (M—439) (204 2) Dec. 14, 1985.
Farbmittel/Polymer Systeme Als Datenspeicher, Werkstofftechik 1077–1081 (1986).
"Erasable Laser Recording in an Organic Dye-Binder Optical Disk Medium", J. Appl. Phys. 60, 2932–37 (1986).
J. Phys. Chem. 89, 2652–2657 (1985).
Journal of Imaging Science, 32, 135–140 (1988).

*Primary Examiner*—Lee C. Wright
*Attorney, Agent, or Firm*—Kevin T. Mansfield; Edward McC. Roberts; JoAnn Villamizar

[57] ABSTRACT

Process for the storage of information in an organic recording layer which, as the result of local treatment of its surface with an organic solvent in accordance with the shape of the information to be marked can alter its absorption spectrum and/or its photoconductivity in such a way that information is produced and stored respectively at the treated areas of this layer. The information thus stored can be read off visually, by means of a micro-reader or by means of an incorporated electrode system.

15 Claims, No Drawings

PROCESS FOR THE STORAGE OF INFORMATION IN AN ORGANIC RECORDING LAYER

The present invention relates to a process for the storage of information by solvent treatment of a system containing certain sensitive organic compounds, to processes for reading this information and to the material thus inscribed.

Optical recording carriers and media for storing information are known. [Cf., for example "Farbmittel/-Polymer-Systeme als Datenspeicher" ("Colorant-/Polymer Systems for Data Storage") by G. Kämpf et al, in Werkstofftechnik, pages 1077–1081, Carl Hanser Verlag, Munich 1986; or "Erasable laser recording in an organic dye-binder optical disk medium", by M. C. Gupta et al, in J. Appl. Phys. 60(8), 1986, pages 2932–2937. ]In these cases the information is recorded by treatment with light of certain wavelengths and intensity or with other suitable high-energy radiation, for example a laser. As a result of absorption of the radiation local heating takes place at the irradiated points, so that indentations are produced at the surface of the recording carrier and/or medium by means of evaporation, softening or melting, or local phase transformations are produced which result in a change in the refractive index or the reflectance. By means of a laser it is possible to produce, for example, holes, bubbles or indentations about 1 to several $\mu m^2$ in size, the reading of this information also being effected by means of a laser of fairly low intensity, utilizing the changed reflectance or light scattering behaviour or these holes/bubbles/indentations or phase transformation. Examples of suitable recording materials are metals, metal oxides, plastics or other light-absorbing layers containing, for example, dyes.

Thus, for example, in U.S. Pat. Nos. 4,307,047 and 4,391,764, in order to inscribe injection-moulded plastic components, radiation-sensitive additives, such as heat radiation indicators, carbon black or graphite, are admixed to the plastic, so that a visual marking is produced at the irradiated areas.

It is also known, in accordance with EP Patent Application No. 019,099, to inscribe high molecular weight organic materials by using pigments or polymer-soluble dyes under irradiation by laser in such a way that the surface of the inscribed material is not damaged as far as the eye can see.

It is also known to change or shift, by means of vapour treatment, the light absorption of certain organic compounds as a separate layer or incorporated in a substrate. Thus the light absorption of polymer films containing, for example, vanadyl phthalocyanine dyes is shifted towards longer wavelengths by treatment with solvent vapour [cf. J. of Physical Chemistry, volume 89, No. 12, pages 2652–2657 (1985)], whereas a corresponding solvent treatment of 1,4-dithioketo-3,6-diphenylpyrrolo-[3,4-c]-pyrrole shifts the light absorption into the near IR range [cf. J. of Imaging Science, volume 32, No. 3, May/Jun. 1988, pages 135–140]. In addition, the latter document also mentions the use of a property of this type, or the resulting change in photoconductivity in the NIR spectral region of the films treated in this way, in electrophotographic applications.

It has now been found that the change in the absorption spectrum and/or the change in the photoconductivity of certain organic compounds after they have been treated with an organic solvent can be used advantageously for the storage of information.

Accordingly, the present invention relates to a process for the storage information in an organic recording layer which, as the result of local treatment of its surface with an organic solvent in accordance with the shape of the information to be marked, can alter its absorption spectrum and/or its photoconductivity in such a way that information is produced and stored respectively at the treated areas of this layer.

Suitable organic recording layers and recording materials respectively are quinacridones, dithioquinacridones, quinacridonequinones, phthalocyanines, diketopyrrolopyrroles, monoketomonothioketopyrrolopyrroles and particularly dithioketopyrrolopyrroles, which can alter their absorption spectrum and/or their photoconductivity as a result of solvent treatment.

Examples of suitable pyrrolopyrroles are 1,4-diketo-3,6-diphenylpyrrolo-[3,4-c]-pyrroles (cf., for example, U.S. Pat. No. 4,415,685) or the corresponding 1,4-dithioketo-3,6-diphenylpyrrolopyrroles (cf. for example, U.S. Pat. No. 4,632,893).

Examples of suitable quinacridones are derivatives of the formulae (I) and (II)

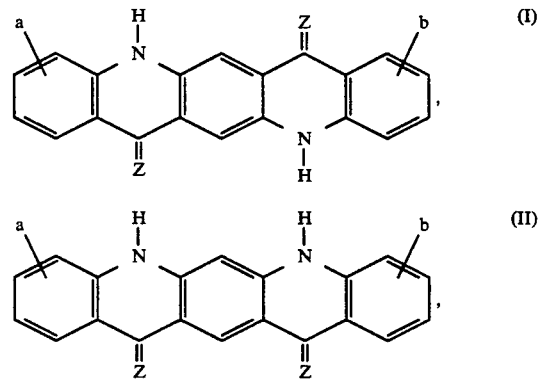

in which a and b are —H, —Cl, —Br, —CH₃ or —OCH₃ and Z is O or S. The quinacridonequinone of the formula

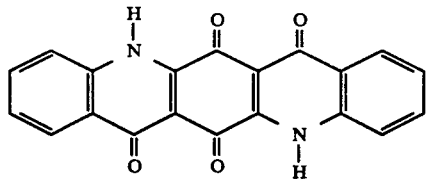

is also suitable. Preferred quinacridones are unsubstituted dithioquinacridones according to the above formulae (I) and (II) in which a and b are —H and Z is S.

Examples of suitable phthalocyanines are metal phthalocyanines, such as titanyl, indium, chloroindium, aluminium, magnesium and particularly vanadyl phthalocyanine, and also phthalocyanine free from metal and also naphthalocyanines which are free from metal or contain metal, for example titanyl, indium, chloroindium, aluminium, magnesium, copper, nickel and vanadyl naphthalocyanine.

Preferred 1,4-dithioketo-, 1-monoketo-4-monothioketo- and 1,4-diketo-3,6-diphenylpyrrolo-[3,4-c]-pyrroles have the formula (III) below

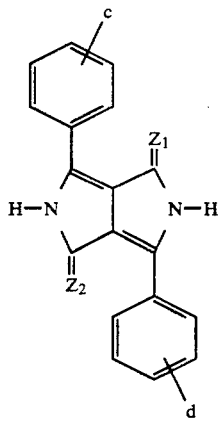

(III)

in which $Z_1$ and $Z_2$ independently of one another are O or S and c and d independently of one another are —H, —Cl, —CH$_3$, —OCH$_3$, —N(CH$_3$)$_2$, —SC$_6$H$_5$ or —S-alkyl having 1 to 12 C atoms. $Z_1$ and $Z_2$ are preferably S. Examples of C$_1$–C$_{12}$ alkyl are methyl, ethyl, n-propyl, n-hexyl, n-decyl and especially n-dodecyl.

The compound of the formula (III) in which $Z_1$ and $Z_2$ are sulfur and c and d are H (abbreviated below to DTPP) is particularly preferred in accordance with the invention.

Mixtures of pyrrolopyrroles of the above structures, mixtures of quinacridones, dithioquinacridones or phthalocyanines and also mixtures of these classes of pigments can also be used.

It is preferable to employ purified recording materials, for example after they have been recrystallized in a suitable inert organic solvent.

The organic recording layer is located on a support or substrate in any desired form and can be present either as a separate layer or, preferably, combined with an organic polymer/binder system, the combined layer in the last-mentioned case either being located on a support or itself at the same time assuming the function of the substrate.

Examples of suitable supports or substrates are any desired metals, for example metal plates, films or foils composed of, for example, aluminium, zinc, magnesium, copper or alloys of these metals, and also plastic foils, films or parts on which metals have been vapour-deposited, for example plastics on which aluminium has been vapour-deposited, and also glass, ceramics, paper, wood or any desired plastics.

If the organic layer is present as a separate layer, it is preferably vapour-deposited onto the support in vacuo. If it is combined with a polymer system, the organic recording material is preferably finely mixed by known processes with the polymer binder, and the mixture is then applied to a suitable support or is itself shaped.

If the layer build-up of the recording material consists of a single layer, the latter consists of one or more organic compounds according to the definition, preferably in a finely divided form, which can, if appropriate, be combined with an organic polymer or binder. The polymer/binder is preferably film-forming, insulating and, if the recording layer is applied to a support/substrate, adhesive. Depending on the application, the polymer/binder system is soluble in organic solvents or in alkaline mixtures of organic solvents which, if appropriate, contain water. Particularly suitable binders/polymers are those based on polycondensation and polyaddition products, such as polyamides, polyurethanes, polyesters, epoxy resins, phenoxy resins, polyketones, polycarbonates, polyvinyl ketones, polystyrenes, polyvinylcarbazoles, polyacrylaides, polymethyl methacrylates, polyvinylbutyrals, polyvinyl chlorides and also copolymers, for example styrene/maleic anhydride copolymers or styrene/methacrylic acid/methacrylic acid ester copolymers. Transparent polymers/binders, for example polycarbonates, acrylic resins, alkyd/melamine resins, polymethyl metahcrylates and epoxy resins, are preferred.

The layer build-up can also consist of several layers. In this case, preferably, a thin, light-reflecting metal layer, for example a thin aluminium foil, is first applied to a support or substrate, and then the organic recording layer suitable in accordance with the invention is applied to the metal layer. A system of this type is particularly suitable for the so-called reflectance process in the reading of information. The light-reflecting layer should be of such a nature that it reflects as quantitatively as possible the light used for scanning when reading. Examples of suitable light-reflecting materials are aluminium, rhodium, gold, tin, lead, bismuth, copper and dielectric mirrors. The thickness of the light-reflecting layer should be such that the layer reflects as completely as possible the light used for scanning. Mirrors having a high reflectance in the suitable wavelength are advantageous for this purpose. The light-reflecting layer advantageously has an optically smooth, plane surface and its surface is of such a nature that the recording layer adheres firmly thereto.

The application of the various layers can also be carried out in such a way that a transparent, conductive layer is first applied to a transparent support or to the substrate as an electrode, the organic recording layer is then applied and finally a thin, conductive metal layer is applied to the latter. A layer build-up of this type is particularly suitable or the photoconductivity process when reading off information. In this build-up the shape of the two electrodes is preferably such that they are prepared in the form of thin strip (for example between about 1 and a few 100 $\mu$m) by a lithographic technique or with the aid of a mask. In addition these electrodes can be mutually so arranged that they cross on the lower and the upper layer. An arrangement of this type is particularly advantageous for the storage of information, for example on so-called "security cards" PROM (programmable read only memory)" or "optical PWB (printed wiring board)". The recording material can also contain further colorants, such as inorganic or organic pigments or polymer-soluble dyes which are inactive towards the solvent treatment carried out in accordance with the invention.

As already stated above, the application of the recording layer according to the application and the metallic reflection layers can be effected by vapour deposition in vacuo. The material to be applied is first put into a suitable vessel, if appropriate equipped with resistance heating, and placed in a vacuum chamber. The substrate to be vapour-coated is put into a holder above the vessel containing the material to be vapour-deposited. This holder is so constructed that the substrate can, if appropriate, be rotated (for example at 50 r.p.m.) and heated. The vacuum chamber is evacuated to about $1.3 \times 10^{-5}$ to $1.3 \times 10^{-6}$ mbar ($10^{-5}$ to $10^{-6}$ mm Hg), and the heating is adjusted so that the temperature of the material to be vapour-deposited rises to the vaporization temperature of the material. The vaporization is continued until the vapour-deposited layer has the desired thickness. Depending on the system build-up, the organic recording compound is first applied and then the reflecting layer, or the procedure can be reversed. If desired, it is possible to dispense with the application of a reflecting layer.

The thickness of the layer which grows during vapour-deposition can be monitored by means of known methods, for example by means of an optical system which, during the vapour deposition, measures the reflectance of the reflective surface covered with the absorption material. The growth of thickness of the layer is preferably followed by means of a quartz oscillator.

All the layers mentioned above can also contain suitable additives, such as levelling agents, surface-active agents or plasticizers, in order to improve the physical properties of the layers.

The organic layer is preferably 200 to 3000 Å, in particular 700 to 1800 Å, for the reflective process; for the photoconductivity process the thickness of the layer is preferably between 400 and 6000 Å, in particular between 700 and 3500 Å.

The local treatment of the organic recording layer is carried out with an organic solvent in the liquid or gaseous state, the solvent producing a change in the absorption spectrum of the compounds according to the definition and/or a change in the photoconductivity. This is effected by subjecting the recording material obtained as described above to treatment with a solvent, for example a ketone, in particular an aliphatic ketone, such as acetone, methyl ethyl ketone and methyl isobutyl ketone, or cyclohexanone, an aliphatic alcohol, such as methanol, ethanol or isopropanol, an aliphatic ether or ester, for example diethyl ether or ethyl acetate, and also tetrahydrofuran, glycol ethers, such as ethylene glycol monoethyl or monomethyl ether or diethyl glycol ether or dimethyl glycol ether, an aliphatic or aromatic hydrocarbon, for example n-hexane, n-decane, toluene, xylenes, chlorobenzene, dichlorobenzenes, nitrobenzene or trichlorobenzenes, and also a halogenated aliphatic hydrocarbon, for example methylene chloride, ethylene chloride and chloroform, and also a polar solvent, such as acetonitrile, formamide, dimethylformamide, dimethyyl sulfoxide, N-methylpyrrolidone or dimethylacetamide and also mixtures of the liquids mentioned above.

In selecting the solvent or a mixture thereof particular care should be taken that the viscosity of the liquid in the treatment stage is optimal in relation to the spraying of the organic recording layer.

Organic solvents or mixtures thereof in the liquid state are preferred.

Preferred solvents are acetone, methyl ethyl ketone, methyl isobutyl ketone, methanol, ethanol, ethyl acetate, tetrahydrofuran and dimethylformamide or a mixture thereof.

The treatment is preferably carried out using a jet of suitable size and shape, which jet an consist of one or more tubes. Examples of suitable jets are the so-called "ink-jet-printer" devices. The treatment is carried out and directed respectively in accordance with the shape and size of the information to be applied to the surface of the material to be marked, a change in the absorption spectrum and/or a change in the photoconductivity being produced at the treated areas. The solvent treatment is preferably effected dynamically, the liquid or vapour treatment being carried out dynamically and the material to be marked remaining static.

The inscription can be carried out by points (point by point) or in a linear manner, such that a very wide variety of types of inscription can be obtained. Examples of these are not only visual but also non-visual information down to the micro-range, for example between about 1 and 100 $\mu$m or more, such as variable text programming of numerical symbols, text programs of standard symbols or special symbols, such as signatures, seals, or data which recur frequently, continuous piece numbering, input of measured quantities, any desired drawings or figures, but also decorations. A typical example of application is a photoreceptor master of various figures or images which operates with integral exposure by conventional electrophotographic processes.

The process according to the invention makes possible a highly reliable inscription/storage of information which is stable to deformation, resistant to light and weathering and easily readable and has clean edge zones. It is also very resistant to temperature changes and UV radiation.

In addition, the optical system of the present process is simpler than those of the existing compact disc systems.

As already mentioned above, a change in the absorption spectrum and/or a change in the photoconductivity at the irradiated areas of the material takes place in the present process under solvent treatment. The change in the absorption spectrum and the stored information respectively can be read off visually, for example as a colour change with a pronounced contrast, or by means of a suitable so-called micro-reader.

Examples of suitable micro-readers are low-energy lasers, for example laser diodes, which can detect the colour change and the change respectively in the absorption spectrum without causing destruction of the information present in the material, and also spectrophotometers which can measure the spectral shifts in the UV, visible or IR range of the inscribed layer and the change in transmission, reflection or absorption resulting therefrom, for example a UV/NIR Lambda 9 spectrophotometer made by Perkin-Elmer or a microscope-type UMSP 80 spectrophotometer made by Carl Zeiss.

Using the quinacridones, quinacridonequinones, phthalocyanines, monoketomonothioketopyrrolopyrroles and dithioketopyrrolopyrroles which are suitable in accordance with the invention, the spectral shift takes place in the IR region, whereas the change in absorption of the diketopyrrolopyrrole derivatives takes place in the visible region.

For example, after treatment 1,4-diketo-3,6-diphenyl-pyrrolo-[3,4-c]-pyrrole (DPP) exhibits a visual colour change from red to orange (increase in absorption to 450 nm), the corresponding 1,4-dithioketo derivative exhibits a spectral shift from 690 nm to 830 nm, dithioquinacridone [cf. above formula I; a and b=H; Z=S] exhibits a spectral shift from 700 mm to 770 mm and vanadyl phthalocyanine exhibits an increase in absorption to 820 nm.

If the information is read off by means of reflection, it is preferable to incorporate, between the substrate and the organic recording layer according to the invention, a layer which reflects as completely as possible, for example a thin metal foil composed of, for example, aluminium, gold, platinum or silver. This layer can be glued, but is especially vapour-deposited.

If compounds of the formula III, but particularly DTPP (1,4-dithio-3,6diphenylpyrrolo[3,4-c]-pyrrole), are used, the change in reflectance can be improved by subjecting compounds of this type to prior treatment with an acid. The treatment with acid can be carried out immediately before the precipitation of the suitable DTPP compound, or the precipitated DTPP compound is re-dissolved and the acid is then added to the solution. A pre-treatment of this type has the result that the absorption spectrum of the above compounds of the formula III is changed respectively the absorption of the compounds in the spectral range 700–800 nm is decreased, which results in an even greater change in absorption after the solvent treatment according to the invention.

For example, a vapour-deposited DTPP layer exhibits an absorption shoulder between about 770 and 800 nm. If DTPP (for example dissolved in an organic solvent) is treated with an acid and is then precipitated or recrystallized, the absorption spectrum of this compound changes inasmuch as that the shoulder between 770 and 800 nm completely disappears. The difference in reflectance then measured after the solvent treatment according to the invention can thus be improved from about 30% to about 80% or more.

A pre-treatment of this type with an acid is preferably carried out by dissolving a compound of the formula III in an organic solvent and subsequently adding an acid. When the solution thus obtained has been allowed to stand, preferably for between 1 minute and two hours, the solution is poured onto ice or into ice/water or is recrystallized. The precipitated product is then isolated by customary processes and dried, for example by filtration and subsequent drying, for example at 50° C. in vacuo. The compound thus pre-treated can then be prepared as a recording layer as already indicated above.

Examples of solvents suitable for this pre-treatment are ketones, in particular aliphatic ketones, such as acetone, methyl ethyl ketone and methyl isobutyl ketone, or cyclohexanone, aliphatic alcohols, such as methanol, ethanol or isopropanol, aliphatic ethers or esters, for example diethyl ether or ethyl acetate, and also tetrahydrofuran, glycol ethers, such as ethylene glycol monoethyl or monomethyl ether or diethyl glycol ether or dimethylglycol ether, and also 1-acetoxy-2-ethoxyethane, and also polar solvents, such as acetonitrile, formamide, dimethylformamide, dimethyl sulfoxide, N-methylpyrrolidone or dimethylacetamide, and also mixtures of the liquids mentioned above.

Examples of preferred solvents are acetone, ethanol, N-methylpyrrolidone and 1-acetoxy-2-ethoxyethane, but especially dimethylformamide and particularly dimethyl sulfoxide (DMSO).

Suitable acids are organic or inorganic acids, for example formic acid, acetic acid or propionic acid, mono-, di- or trichloroacetic acid, oxalic acid, malonic acid, succinic acid, phthalic acid, benzenesulfonic acid or toluenesulfonic acid, and also phosphoric acid, nitric acid, hydrochloric acid or sulfuric acid. Preferred acids are, for example, formic acid, acetic acid, hydrochloric acid and phosphoric acid, but especially nitric acid and particularly sulfuric acid.

The acid concentration is preferably, for example, between $10^{-6}$ and $10^{-2}$ M (molar), but particularly between $10^{-5}$ and $10^{-3}$ M.

The system DTPP/DMSO, pre-treated with $H_2SO_4$, preferably in a concentration of about $2 \times 10^{-4}$ molar, is particularly preferred in accordance with the invention.

A transparent substrate layer, for example a layer of polymethyl methacrylate or polycarbonate or glass, is preferable for reading information by transmission.

A change in the photoconductivity produced by solvent treatment can be measured with an incorporated system of measuring electrodes.

For reading off information on the basis of photoconductivity its is preferable to use recording materials composed of several layers, for example by first applying a conductive support as a transparent electrode on the transparent substrate, then applying thereon the organic layer suitable in accordance with the invention and finally applying a second conductive support as a measuring electrode.

Transparent electrodes are preferably vapour-deposited and are composed, for example, of indium dioxide, indium/tin oxide, antimony/tin oxide, zinc oxide or metallized organic films.

Measuring electrodes are composed, for example, of Al, Ni, Au or Ag, and are preferably in the form of thin foils.

In the following examples parts are parts by weight, unless stated otherwise.

EXAMPLE 1

Aluminium powder is first put into a suitable vessel and placed in a vacuum chamber; the PET substrate (polyethylene terephthalate 75 μm thick) to be vapour-coated is inserted into a holder above the vessel containing the aluminium powder. The vacuum chamber is then evacuated to about $3.9 \times 10^{-6}$ mbar $[=3 \times 10^{-6}$ mm Hg] in such a way that the vaporization can take place until the vapour-deposited layer (reflective layer) has a thickness of about 2000 Å [about 30 Å per second]. 1,4-Dithioketo-3,6-diphenylpyrrolo-[3,4-c]-pyrrole (DTPP) is then vapour-deposited in the same manner onto the aluminium layer until the vapour-deposited layer is about 1500 Å thick.

Information in point form (diameter about 125 μm) is then treated or inscribed with a liquid mixture composed of 1:1 (by volume) acetone/ethanol by means of a Hewlett Packard "®Thinkjet Printer" injector, the plastic jet of the injector having been replaced by a corresponding aluminium jet.

The reflectance spectrum of the areas on the layer containing the information is then measured by means of an NIR spectrophotometer, a difference in reflectance of 30% at 830 nm being obtained.

EXAMPLE 2

A recording layer 1500 Å thick [obtained by finely dispersing 20% by weight of unsubstituted dithioquinacridone according to formula I above in ®Lucite (DuPont PMMA) and then applying to an aluminium plate using a commercially available application rod] is inscribed in the same manner as in Example 1 above, but using a 1:1 (by volume) mixture of tetrahydrofuran/methanol instead of an acetone/ethanol mixture. The difference in reflectance at 830 nm is 23%.

EXAMPLE 3

Indium/tin oxide is sprayed onto a glass substrate until a thickness of 300 Å has been reached (by paring material (idium/tin oxide) by means of an argon plasma from a sintered plate composed of indium/tin oxide and depositing it in the form of a thin layer on a glass substrate). A layer of DTPP 2500 Å thick in then vapour-deposited onto this conductive oxide layer in vacuo as in Example 1, after which information in point form is first stored exactly as in Example 1, and the recording layer is then vapour-coated with an aluminium layer.

The information thus stored is then read by means of a GaAs diode laser at 830 nm, a potential of 40 volts being applied between the two electrodes (aluminium and indium/tin oxide) in series with a resistance of 1 MΩ, and the conductivity being measured with and without light. The electric potential above the non-inscribed areas is only about 1/30 of the potential above the inscribed area ($\approx$29.5 dB).

Definition of dB: $dB = 20 \log \frac{V_2}{V_1}$, where $V_2 : V_1$ is 30.

[$V_1$ = initial potential in the dark (without light);
$V_2$ = initial potential when exposed to light]

EXAMPLE 4

The procedure of Example 3 is repeated, but with the difference that titanyl phthalocyanine is used instead of DTPP and the voltage drop is measured at a potential of 25 volts (instead of .40 volts) between the electrodes. The change in the potential above the non-modified points compared with the modified areas is a factor of approximately 18 ($\approx$25.1 dB).

EXAMPLE 5

(electrophotographic inscription)

A photoreceptor which can be positively charged and has the following substrate structure CGL/CTL/Al is prepared as follows: The charge-transporting material (CT), consisting of a solid solution of 4-diethylaminobenzaldehyde 1,1-diphenylhydrazone and polycarbonate, is applied to an aluminium substrate (about 50 μm thick). The charge-generating layer (CG)[DTPP] is then vapour-deposited onto the above CT layer in vacuo as in Example 1 until a thickness of 1000 Å has been reached; the system is then inscribed or stored with information in point form as in Example 1 above. The layer is then charged by means of a corona discharge and is then discharged by means of integral exposure (for example a tungsten lamp). The photosensitivity is about 3 μJ/cm².

The recording layer containing the information is used as a photoreceptor sample.
CGL=charge-generating layer;
CTL=charge-transporting layer;
Al=aluminium substrate.
Corona discharge: when a high potential (for example approx. $10^5$ V/cm) is applied between two electrodes, a discharge called "corona discharge" takes place. This discharge is used in electrophotography to charge the photoreceptor.

EXAMPLE 6

Nitrogen gas is passed into 100 ml of DMSO at 20° C. for one hour in order to remove oxygen, after which 1.5 g of DTPP are dissolved in this solvent, and 1 ml of concentrated sulfuric acid is then added. The resulting solution is allowed to stand for 90 minutes and is then poured onto ice. The precipitated product is filtered off and dried at 50° C. in vacuo for 6 hours. In comparison with the untreated product, the absorption spectrum of this product (measured as a vapour-deposited film) no longer exhibits a shoulder between 770 and 800 nm.

A recording layer is then prepared as in Example 1 using the product thus treated, aluminium powder being vapour-deposited onto a PET substrate (75 μm thick) until the vapour-deposited layer has a thickness of about 2000 Å. DTPP is then vapour-deposited onto the aluminium layer in the same manner as in Example 1, until the vapour-deposited layer is about 1500 Å thick.

Information in point form is then inscribed and read exactly as in Example 1 above. The reflectance spectrum measured on the points of the layer containing the information exhibits a difference in reflectance of 85% at 830 nm between the non-inscribed layer and the inscribed layer.

EXAMPLE 7

Example 6 is repeated, but with the difference that 100 ml of NMP (N-methylpyrrolidone) and 2 ml of concentrated HNO$_3$ are used instead of 100 ml of DMSO and 1 ml of concentrated H$_2$SO$_4$, the mixture is allowed to stand for 45 minutes (instead of 90) and 500 ml of water instead of ice are used for the precipitation.

The absorption spectrum of the product thus obtained does not exhibit a shoulder between 770 and 800 nm, and the difference in reflectance measured is 80% at 830 nm.

EXAMPLE 8

An acid pre-treatment of DTPP is repeated as in Example 6, after which, using the resulting pre-treated product, a recording layer is prepared and inscribed as in Example 2. The difference in reflectance at 830 nm is 70%.

What is claimed is:

1. A process for the storage of information in an organic recording layer comprising a quinacridone, a dithioquinacridone, a quinacridone quinone, a phthalocyanine or a diketo-pyrrolopyrrole, monoketomonothioketo-pyrrolopyrrole or dithioketo-pyrrolpyrrole which process comprises local treatment of the surface of said organic recording layer with an organic solvent in accordance with the shape of the information to be marked thereby altering its absorption spectrum, its photoconductivity or both in such a way that information is produced and stored respectively at the treated areas of this layer.

2. A process according to claim 1, wherein compounds of the formulae

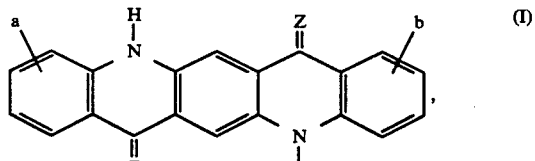

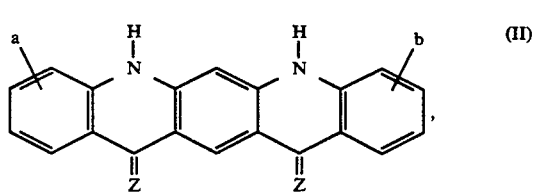

in which a and b are —H, —Cl, —Br, —CH$_3$ or —OCH$_3$ and Z is O or Z, are used as the quinacridone or dithioquinacridone.

3. A process according to claim 2, wherein, in the formulae I and II, a and b are —H and Z is S.

4. A process according to claim 1 wherein compounds of the formula III

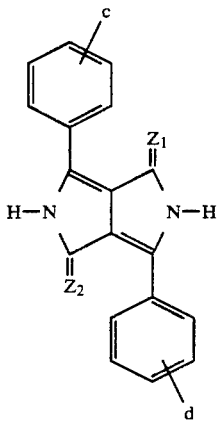

(III)

in which Z$_1$ and Z$_2$ independently of one another are O or S and c and d independently of one another are —H, —Cl—, —CH$_3$, —OCH$_3$, —N(CH$_3$)$_2$, —SC$_6$H$_5$— or —S-alkyl having 1 to 12 C atoms, are used as the diketo-, monoketomonothioketo- or dithioketo-pyrrolopyrroles.

5. A process according to claim 4, wherein Z$_1$ and Z$_2$ are S.

6. A process according to claim 4, wherein Z$_1$ and Z$_2$ are S and c and d are H.

7. A process according to claim 1, wherein the original recording layer is combined with an organic polymer/binder system.

8. A process according to claim 7, wherein a transparent polymer/binder belonging to the polycarbonate, acrylic resin, alkyd/melamine, polymethyl methacrylate or epoxide series is used.

9. A process according to claim 1, wherein the organic recording layer is applied to a thin, light-reflecting metal layer which, in turn, has been applied to a support and a substrate respectively.

10. A process according to claim 1, wherein a transparent support and a substrate respectively is used and a transparent conductive layer is first applied to the support as an electrode, then the organic recording layer is applied thereto and finally a thin conductive metal layer is applied.

11. A process according to claim 1, wherein the recording layer has a thickness of 200 to 6000 Å.

12. A process according to claim 1, wherein the local treatment of the organic recording layer is carried out with an organic solvent or a mixture of organic solvents in the liquid state.

13. A process according to claim 12, wherein the solvent is acetone, methyl ethyl ketone, methyl isobutyl ketone, methanol, ethanol, ethyl acetate, tetrahydrofuran, dimethylformamide or a mixture thereof.

14. A process according to claim 4, wherein the compounds of formula III are treated with an acid prior to forming the organic recording layer.

15. A process according to claim 18, wherein 1,4-dithioketo-3,6-diphenylpyrrolo-[3,4-c]-pyrrole (DTPP) is employed as the compound of the formula III and sulfuric acid is employed as the acid, dimethyhl sulfoxide being used as the solvent.

* * * * *